(12) United States Patent
Stewart et al.

(10) Patent No.: US 9,979,312 B2
(45) Date of Patent: *May 22, 2018

(54) ENERGY SAVING HIGH FREQUENCY SERIES BUCK AC VOLTAGE REGULATOR SYSTEM

(71) Applicant: Edge Electrons Limited, Hong Kong (HK)

(72) Inventors: Neal George Stewart, Hong Kong (HK); Wing Ling Cheng, Hong Kong (HK)

(73) Assignee: Edge Electrons Limited, Hong Kong (HK)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/316,162

(22) PCT Filed: Jan. 12, 2015

(86) PCT No.: PCT/CN2015/070538
§ 371 (c)(1),
(2) Date: Dec. 3, 2016

(87) PCT Pub. No.: WO2015/184804
PCT Pub. Date: Dec. 10, 2015

(65) Prior Publication Data
US 2017/0141692 A1 May 18, 2017

Related U.S. Application Data

(63) Continuation of application No. 14/511,187, filed on Oct. 10, 2014, now Pat. No. 9,819,185, and a (Continued)

(51) Int. Cl.
*H02M 5/293* (2006.01)
*H02M 1/44* (2007.01)
(Continued)

(52) U.S. Cl.
CPC ............. *H02M 5/293* (2013.01); *H02M 1/32* (2013.01); *H02M 1/44* (2013.01); *G05F 1/12* (2013.01);
(Continued)

(58) Field of Classification Search
CPC ........ H02M 5/22; H02M 5/257; H02M 5/275; H02M 5/293; G05F 1/12; G05F 1/44; G05F 1/445
See application file for complete search history.

(56) References Cited

U.S. PATENT DOCUMENTS 5,942,884 A * 8/1999 Soar ...................... H02M 5/225
323/222
5,949,662 A 9/1999 Boldin et al.
(Continued)

FOREIGN PATENT DOCUMENTS

CN 1967994 A 5/2007
CN 101692574 A 4/2010
(Continued)

OTHER PUBLICATIONS

Extended European Search Report on EP Application No. 15802938.9, dated Feb. 2, 2018.

*Primary Examiner* — Fred E Finch, III
*Assistant Examiner* — Rafael O De Leon Domenech
(74) *Attorney, Agent, or Firm* — Idea Intellectual Limited; Margaret A. Burke; Sam T. Yip

(57) ABSTRACT

An energy saving alternate current (AC) series voltage regulator comprises an AC high frequency (HF) series voltage buck power regulator, a bypass contactor (K1), a bidirectional AC semiconductor device (S1) connected in parallel with the bypass contactor and a control circuitry. Under the condition of an input AC mains voltage (Vin) drops below a specified and set optimum energy savings
(Continued)

voltage or a lower selected voltage point, the control circuitry transitions both the slow bypass contactor and the fast bidirectional AC semiconductor device, then the AC high frequency (HF) series voltage buck power regulator are switched out to save the AC high frequency (HF) series voltage buck power regulator internal power electronics usage. Under this condition, the lower input AC mains voltage is directly delivered to an electrical load by the contactor bypass system, hence achieving more energy savings.

14 Claims, 2 Drawing Sheets

Related U.S. Application Data continuation of application No. 14/525,230, filed on Oct. 28, 2014, now Pat. No. 9,148,058.

(60) Provisional application No. 61/889,543, filed on Oct. 11, 2013, provisional application No. 61/896,635, filed on Oct. 28, 2013, provisional application No. 61/896,639, filed on Oct. 28, 2013, provisional application No. 61/908,763, filed on Nov. 26, 2013, provisional application No. 61/913,932, filed on Dec. 10, 2013, provisional application No. 61/913,934, filed on Dec. 10, 2013, provisional application No. 61/913,935, filed on Dec. 10, 2013, provisional application No. 62/006,906, filed on Jun. 3, 2014, provisional application No. 62/006,901, filed on Jun. 3, 2014, provisional application No. 62/006,900, filed on Jun. 3, 2014.

(51) Int. Cl.
 *H02M 1/32* (2007.01)
 *H02M 5/257* (2006.01)
 *H02M 5/275* (2006.01)
 *H02M 5/22* (2006.01)
 *G05F 1/445* (2006.01)
 *G05F 1/12* (2006.01)
 *G05F 1/44* (2006.01)

(52) U.S. Cl.
 CPC ............... *G05F 1/44* (2013.01); *G05F 1/445* (2013.01); *H02M 5/22* (2013.01); *H02M 5/257* (2013.01); *H02M 5/275* (2013.01)

(56) References Cited

U.S. PATENT DOCUMENTS

| | | | |
|---|---|---|---|
| 6,330,170 B1 * | 12/2001 | Wang | H02J 9/062 363/17 |
| 8,729,772 B1 * | 5/2014 | Persson | B06B 1/0276 310/317 |
| 2010/0134078 A1 | 6/2010 | Murakami et al. | |
| 2012/0119581 A1 * | 5/2012 | Silberbauer | H02J 9/06 307/66 |
| 2016/0013733 A1 * | 1/2016 | Pregitzer | H02H 7/1252 363/126 |

FOREIGN PATENT DOCUMENTS

| | | |
|---|---|---|
| CN | 201444617 U | 4/2010 |
| DE | 19546420 C1 | 4/1997 |

\* cited by examiner

ENERGY SAVING HIGH FREQUENCY SERIES BUCK AC VOLTAGE REGULATOR SYSTEM

CLAIM FOR PRIORITY

This application claims priority to the U.S. Provisional Patent Application No. 62/006,900, filed Jun. 3, 2014, U.S. Provisional Patent Application No. 62/006,901, filed Jun. 3, 2014, U.S. Provisional Patent Application No. 62/006,906, filed Jun. 3, 2014, U.S. Non-provisional patent application Ser. No. 14/511,187, filed Oct. 10, 2014, U.S. Non-provisional patent application Ser. No. 14/525,230, filed Oct. 28, 2014, and U.S. Non-provisional patent application Ser. No. 14/565,444, filed Dec. 10, 2014, the disclosures of which are incorporated herein by reference in their entirety.

FIELD OF THE INVENTION

The present invention generally relates to power electronics. Particularly, the present invention relates to methods and power electronics for regulating alternative current (AC) voltage. More particularly, the present invention relates to energy savings by regulating an optimized AC voltage delivered to a power user facility or load.

BACKGROUND OF THE INVENTION

Full AC voltage regulators (AVR's) are used to closely control and regulate the output AC voltage level being delivered to a load connected to the output of the AC voltage regulator, regardless of the varying AC voltage, high and low voltages, on the input of the AC voltage regulator. This has been traditionally done by various low frequency (LF), typically at 50 or 60 Hz, or other frequencies, electrical mains magnetic structures. These structures are typically tapped at specific discrete transformer voltage taps in various transformers or transformer configurations. Nonetheless, all these structures rely on traditional AC switching devices such as relays or semiconductor devices such as silicon-controlled rectifiers (SCR)'s or gate turn off thyristor (GTO)'s connected as anti-parallel AC switches, TRIAC's, AC switches such as insulated-gate bipolar transistors (IGBT)'s, MOSFET transistors, and SCR's configured as AC switches, e.g. connected between rectifiers. These AC switches are selected and activated by the electronic control circuit to automatically switch the selected magnetic transformer structure tap, in turn adjusting the transformer or transformer configuration turns ratio to control the AC output voltage as close as possible to the desired level.

Another traditional method to regulate an output AC voltage is to use an electro-mechanically-adjusted auto-transformer that is driven by electrical mechanical means, such as a controlled electrical motor. The electronic control in this case senses the input voltage and then drives the electro-mechanical means to move the output contact to adjust the turns of the auto-transformer, in turn sets the correct turns ratio to fix the output AC voltage to the desired level. These electro-mechanically-adjusted auto-transformer devices are also LF magnetic structures, typically at 50 Hz or 60 Hz, or other frequencies, and generally use carbon brushes to make the moving electrical contact to the auto-transformer windings. These brushes, however, undergo mechanical wear as such they need frequent maintenance and replacement.

A more sophisticated fully electronic version utilizes again LF mains transformers, typically at 50 Hz or 60 Hz, or other frequencies, connected in series between the AC input and the AC output of the voltage regulator. As the input AC voltage level varies, the AC voltage regulator electronic control senses the input voltage level, and then sets up an in-phase positive or an in-phase negative differential AC voltage that adds or subtracts, to or from, the varying input AC voltage to maintain the output AC voltage to the desired set level. This traditional approach, in its various forms, still uses LF mains frequency transformers or LF magnetic structures, typically at 50 Hz or 60 Hz, or other frequencies. In one configuration, the power electronics generates a LF mains frequency to correct the input AC voltage by a high frequency pulse width modulation (HF PWM) means, and this in-phase correction voltage to adjust the input AC mains voltage, is applied to the primary of the LF transformer, with the secondary of the LF transformer connected in series between the input and output of the AC power line. But still the magnetic structures used in these configurations, even though the power electronics operate at higher PWM frequencies, the final differential AC waveform is still applied to the LF series transformer, typically at 50 Hz or 60 Hz, or other frequencies, hence the LF transformer or magnetic structures still have the disadvantage of size and weight.

There is an optimized AC voltage, which is typically a voltage at the lower level or even below the legislated AC voltage tolerance band, and is well known in the industry as Conservation Voltage Reduction (CVR) or voltage optimization, aimed at energy savings. It is well accepted in the electrical industry, that there are energy savings of approximately a percentage energy savings proportional to each percent of voltage reduced, but is obviously application and load specific.

SUMMARY OF THE INVENTION

The present invention is to optimize energy savings and protect the electrical loads from energy wasting high AC input voltages above an optimum energy savings voltage level. Consider that in the case where a full AVR is used, of the input mains AC voltage falling below a selected optimum level, the full AVR not only continues to use its internal power electronics to boost the low input AC voltage to the set regulated output AC voltage, the AVR would increase or boost the input AC mains voltage to the set optimum output energy savings voltage level, then the energy savings would not be optimized under low input mains AC voltage, as the input current hence the input power would increase as the full AVR increases or boosts the low mains input AC voltage. In the present invention, if the input AC mains voltage drops below a specified and set optimum energy savings voltage or a lower selected voltage point, the electronics control transitions both a slow bypass contactor combined with a fast bidirectional AC semiconductor device connected in parallel to the contactor bypass, then the HF AC voltage regulator power electronics are switched out to save the HF AC voltage regulator internal power electronics usage. Under this condition, the lower mains voltage is directly delivered to the electrical load by the contactor bypass system, hence achieving more energy savings than in the case where a full voltage increasing AVR is used.

The bypass contactor, NC contactor bypass contacts as in accordance to the preferred embodiment of the present, combined with a parallel-connected bidirectional AC semiconductor device system can be used to protect the electronics from power surges due to load or fault currents surges. Although only single-phase versions of the present invention are described herein, any ordinarily skilled person in the art can apply the inventive principles to any polyphase, such as a three-phase, AC electrical system. Furthermore, even though voltage regulation can be achieved with shunt or series methods, the preferred embodiments of the present invention use the series voltage regulation method. In accordance to various preferred embodiments, the HF series AC buck voltage regulators disclosed in U.S. Non-provisional patent application Ser. No. 14/525,230 and U.S. Non-provisional patent application Ser. No. 14/565,444 are employed in the present invention.

BRIEF DESCRIPTION OF THE DRAWINGS

Embodiments of the invention are described in more detail hereinafter with reference to the drawings, in which.

DETAILED DESCRIPTION OF THE INVENTION

In the following description, methods, systems, and apparatuses for regulating an output AC voltage to a desired level regardless of the variation in an input AC voltage and the like are set forth as preferred examples. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without undue experimentation.

Figure 1:
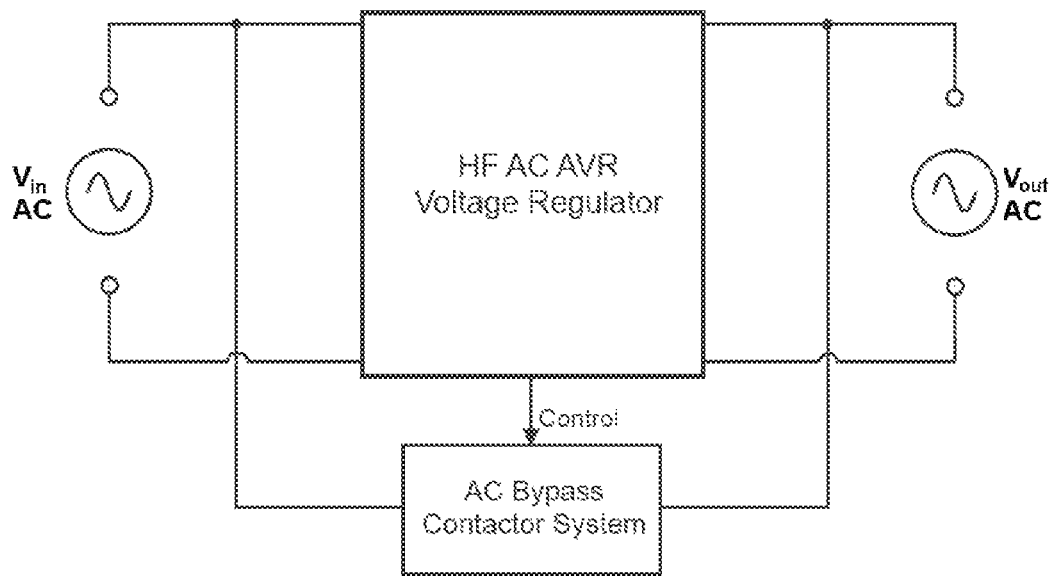
FIG. 1 depicts a block diagram of a HF AC voltage regulator being employed in conjunction with a bypass contactor system in accordance to various embodiments of the present invention.

In accordance to a preferred embodiment of the present invention, a HF AC voltage regulator is used in conjunction with a bypass contactor system as shown in FIG. 1. Since the size of any magnetics is largely inversely proportional to its operating frequency, the present invention was approached with this as a central design parameter. The primary goal of the present invention is to achieve an energy savings system using a HF AC voltage regulator that utilizes only high frequency (e.g. 1 kHz to 1000 kHz) magnetic structures that reduce significantly the size, weight and cost of these magnetic structures and incorporated into an energy savings system working in conjunction with a bypass contactor combined with a fast switching bidirectional AC semiconductor device connected in parallel with the contactor bypass contacts.

The energy saving HF AC voltage regulation system is designed to decrease and regulate the output AC voltage applied to the load to a set energy savings optimum AC voltage if under the condition of high AC input voltage above a set optimum energy savings specified output voltage. In a system where a full AVR is used, under the condition of low AC input voltage below an optimum energy savings voltage, energy will be spent internally to operate in increasing or boosting the input voltage. It would not save any energy by the load as it would increase or boost the low AC input voltage back to the higher set level. The present invention, under the condition of low AC input voltage level below the optimum selected output voltage level, provides a bypass contactor combined with fast bidirectional AC semiconductor device connected in parallel with the slower bypass contactor. Both the fast bidirectional AC semiconductor device and the bypass contactor are transitioned by the control electronics so that the fast bidirectional AC semiconductor device initially bypasses the HF AC voltage regulator, then the slower bypass contactor contacts close and fully bypasses the HF AC voltage regulator and including the bidirectional AC semiconductor device connected in parallel to the bypass contactor contacts. The electronic control switches out the HF AC voltage regulator such that the HF AC voltage regulator internal power electronics energy usage is saved. Further, the low AC mains input voltage is applied directly to the load, bypassing any voltage drop of the HF AC voltage regulator power electronics. This achieves additional energy savings with the low input AC mains voltage applied directly to the load.

There are two ways to regulate voltage on the AC mains. One is by series voltage regulation method, where the AC input and AC output are "decoupled" and just the differential voltage between the unregulated input AC voltage. The specified and fixed regulated output AC voltage is processed by the power electronics. The other is by shunt current regulation method, where the AC voltage is changed by injecting a specified current in shunt or parallel with the mains, and the level of that current is injected or absorbed by the power electronics interchanging energy with an internal storage device, such as a high voltage electrolytic capacitor. The shunt current regulation method, therefore, controls the AC mains line voltage by driving or absorbing a specified current into or from the mains line impedance or resistance.

In the present invention, as shown in FIG. 1, the HF AC voltage regulator can use either the shunt or series voltage regulation method as described above, but in accordance to the preferred embodiment of the present invention the HF AC series voltage regulation is the preferred method as it is more predictable since the series voltage regulation method is independent of line impedance.

In worldwide electrical systems, the point-of-use low voltage distributions are generally under either 110/120 VAC or 220/230/240 VAC, although most of the world is standardizing to nominal 120 VAC or 230 VAC systems for low voltage distribution voltages. Also there are standardized and legislated electrical system specifications, and especially distribution voltage levels and tolerances to be delivered to the switchboards of domestic and commercial premises. For example in the U.S.A., the standard distribution voltage for domestic and commercial premises is 120 VAC (specified by FERC/NERC), with voltage tolerances of maximum of +5% and minimum of −5%. In the higher voltage 230 VAC systems such as Australia (specified by AS60038), and the UK (specified by EN50160), the allowed voltages tolerances are specified as a maximum of +10% and a minimum of −6%. It is generally accepted in the industry that overvoltage levels can be higher. An overvoltage of +10% and an under-voltage of −10%, as the extreme limits are still acceptable. However, these extreme maximum voltages when applied to electronic equipment and appliances, especially electrical motors, that are designed to the nominal specified standard voltages such as 120 VAC in the USA and 230 VAC in Australia and UK, not only waste energy because of the additional higher working voltage, but also impede optimal performances. Motors and transformers can overheat, shorten working life times, and any equipment connected to the electrical system can be permanently damaged.

Therefore, in the U.S.A. for example, with the voltage range-nominal 120 VAC, maximum voltage of +5% being 126 VAC, overvoltage of +10% being 132 VAC, minimum of −5% being 114 VAC, under-voltage of −10% being 108 VAC, it is generally accepted in the industry that the transmission and distribution operators in the U.S.A. will deliver the minimum voltage of 114 VAC to the premises switchboard, and allowing another 3.5% voltage drop estimated for a minimum of 110 VAC to the actual loads, such as appliances in domestic premises.

To deliver the specified range of voltages within the allowed voltage tolerances from the nominal voltage of 120 VAC to each domestic or commercial premise on a local power island distribution network, it requires a higher voltage at the input to the local power island distribution network because of the voltage drop that takes place serially along the physical wires of the distribution network due to the electrical resistance of the wires and system conductors. Thus, typically premises close to the sub-station of the distribution network local power island will see the higher maximum voltage ranges, and further along the local power island distribution network, the lower voltages in the range. In the U.S.A. for example, the voltage range can vary from 126 VAC or higher to 114 VAC or lower for a nominal 120 VAC local power island distribution network. Similarly, for the nominal 230 VAC countries, such as Australia and the UK, the voltage range can vary from 253 VAC or higher at the local power island substation to 216 VAC or lower along the distribution network for a nominal 230 VAC local power island distribution network.

There have been major investments made in the local power island distribution networks to minimize the tolerances of the delivered mains AC voltage to all domestic and commercial premises. But this has become more difficult due to the increasing usage and complex electronic loads being added into domestic and commercial premises, changing loads and power factors across the LV distribution network. In the U.S.A. for example, there is now more domestic and commercial electricity usage than industrial usage. With the recent disruptive advent of private domestic and commercial distributed energy generation (DEG), coupled with legislated Feed In Tariff (FIT) in many countries where any private domestic or commercial premise owner can purchase and install and generate their own electrical power (e.g. in the case of domestic photovoltaic (PV) installations), power can be impressed back onto the local power island distribution network, adding dramatically to the power system complexity and voltage range volatility, especially overvoltage.

Electrical and electronic equipment and appliances, especially electrical motors, are specifically design to operate at the nominal specified standard voltages, such as 120 VAC in the U.S.A., and other 120 VAC countries, and 230 VAC in Australia, UK, and other 230 VAC countries. Voltages over the nominal design standard voltages not only can damage the connected electrical and electronic equipment, but also cause the consumption of more energy than is necessary. Hence there is an optimum voltage in general that optimizes the performance and delivers the maximum energy savings.

Referring to FIG. 1. In this example, the optimum energy savings voltage on the output of the HF AC voltage regulator is selected to be the nominal mains voltage −5% to achieve normal equipment performance and maximize energy savings. Thus, energy savings set voltage can be 114 VAC for nominal 120 VAC systems, and 220 VAC for nominal 230 VAC systems, or other lower energy saving voltages could be selected, and this is just an example to clearly show the concept and other energy savings optimization voltages can be obviously specified for the output of the HF AC voltage regulator. For example, in the present invention only the HF AC voltage regulator needed working in conjunction with a series bypass contactor, and the output voltage of the HF AC voltage regulator is set at energy saving level of 114 VAC for nominal 120 VAC systems, and set at energy saving level of 220 VAC for 230 VAC systems, so under the conditions of extreme or overvoltage the HF AC AVR voltage regulator keeps the output voltage to the load at the selected set energy savings optimizing voltages.

Under the condition of that the input AC mains voltage falling below the energy savings set voltage (e.g. 114 VAC for nominal 120 VAC systems and 220 VAC for nominal 230 VAC systems), if a full AVR is used, then the full AVR will not only be using internal power to increase or boost the low input mains AC voltage, it will not save as much energy as the present invention. In accordance to various embodiments of the present invention, when the control electronics sense the input AC mains voltage falling below the energy savings set voltage, the control electronics, a bypass contactor system is activated, and switch off the HF AC voltage regulator power electronics are switched off, saving internal power electronics energy consumption. Under this condition, the low main AC input voltage is applied directly to the load, minimizing the voltage drop and power electronics usage of the HF AC voltage regulator that stayed connected in the circuit. As shown in FIG. 1, additional energy savings is achieved by the low input mains AC voltage being applied directly to the load through the bypass contactor system.

Still referring to FIG. 1. Although HF AC voltage regulation can be achieved either by shunt or series method, the series method is used in the preferred embodiments of the present invention. In accordance to various embodiments of the present invention, any HF AC voltage regulator can be used in parallel with a bypass contactor system to create an energy savings high frequency AC voltage regulation system.

Figure 2:
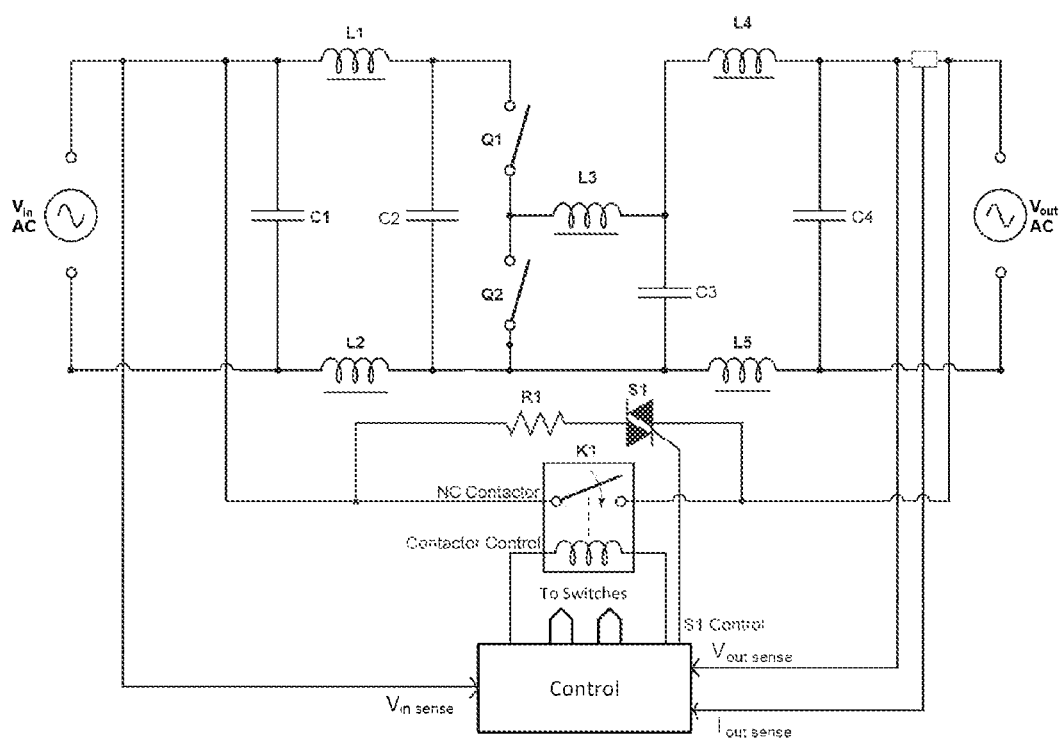
FIG. 2 depicts a circuit diagram of an embodiment of a HF AC voltage regulator and a bypass contactor system in accordance to various embodiments of the present invention.

Referring to FIG. 2. Some of the preferred embodiments of the HF AC voltage regulator include, but not limited to, the topologies of HF AC series buck voltage regulators as disclosed in U.S. Non-provisional patent application Ser. No. 14/525,230 and U.S. Non-provisional patent application Ser. No. 14/565,444. Described in the '230 patent application and shown herein again in FIG. 2 is a HF series AC buck voltage regulator with bidirectional AC switches Q1 and Q2. In addition, HF filter components are added to suppress and filter the HF (e.g. 1 kHz-1,000 kHz) switching frequency on the input and output. Filter inductors L1 and L2 with filter bypass capacitors C1 and C2 on the input; and filter inductors L4 and L5 with filter bypass capacitors C3 and C4 on the output. Capacitors C2 and C3 are optional depending on the components used and the operating frequency. Inductor L3 is a power inductor that is designed to operate at HF (e.g. 1 kHz to 1,000 kHz).

The AC switching devices Q1 and Q2 switch at HF (e.g. 1 kHz to 1,000 kHz) under electronic control either through analogue or mixed analogue or digital circuitry, but typically digital control circuitry with DSP or microprocessor signal processing. The outputs from the control electronics drive the AC semiconductor devices with HF (e.g. 1 kHz to 1,000 kHz) modulated PWM modulation, and at each HF point along the LF mains AC voltage input, typically at 50 Hz or 60 Hz, the control electronics generates a specific pulse of width wide enough to drive the AC switches Q1 and Q2 to generate a negative differential voltage in combination with power inductor L3, hence bucking and regulating the output voltage at each point along the input AC voltage to the desired value set by the internal control reference.

For example, if the control is switching at a design frequency of 25,000 Hz, then every 40 microseconds the amplitude of the input mains LF voltage, typically at 50 Hz or 60 Hz, is bucked and decreased at that point, against the set internal voltage reference. Thus, every 40 microseconds the circuit bucks the input AC voltage to adjust and regulate the desired set output AC voltage.

The input filter comprises capacitors C1 and C2, and filter inductors L1 and L2. The output filter comprises capacitors C3 and C4, and filter inductors L4 and L5. Alternatively, various combinations of HF filter elements can be used to filter and bypass the HF switching frequencies of the AC bidirectional semiconductor switches, switching at HF, such as in this example, at 25,000 Hz.

The circuitries and description thereof disclosed herein are simplified for clarity and various other circuit configurations and devices can be used in applying the principles of the present invention. For instance, the bidirectional AC switches are semiconductor devices and can comprise of various circuit configurations, but these switches are still acting as AC bidirectional semiconductor switches as used commonly in the industry. Such Bidirectional AC semiconductor switches, for example, but not limited to, can be a rectifier bridge comprising of four rectifiers with a unipolar semiconductor device configuration inserted in the bridge such as SCR, GTO, IGBT, MOSFET, or any other semiconductor device used for the same effect with PWM drive control that can create a controlled bidirectional AC semiconductor switch device. Also, other semiconductor AC switch configurations and devices used in the industry with or without rectifiers such as back-to-back or anti-parallel-SCR's, GTO, IGBT, RB-IGBT, MOSFET, any other back-to-back or anti-parallel bidirectional AC semiconductor devices or configurations, or any other similar new semiconductor devices in the future, such as, but not limited to, GaN, SiC are some of the alternative embodiments of the present invention.

Still referring to FIG. 2. The HF series buck AC voltage regulator that utilizes HF (e.g. 1 KHz-1,000 KHz) power inductor L3 in combination with AC bidirectional semiconductor switches Q1 and Q2, which are driven by an electronic control circuit, creates a novel topology that can decrease the input AC voltage and regulate the AC output voltage to a set desired optimum energy savings level. Furthermore, this HF series buck AC voltage regulator only has to process the differential power across the buck inductor (power inductor L3) to decrease the input to a regulated output AC voltage. This configuration has a much less power consumption in relative to the total output power. The buck inductor only has to handle the power required to adjust the differential input AC voltage to reduce the output AC voltage to the desired optimum energy savings set level.

Under the condition of that the mains AC input voltage falling below the selected optimum energy savings set level, the control electronics senses the input AC mains voltage, transitions the bypass contactor K1 as well as the bidirectional AC semiconductor device S1 connected in parallel with the bypass contactor K1, then disengages the series buck AC voltage regulator power electronics. The fast bidirectional AC semiconductor device S1 initially bypasses the HF series buck AC voltage regulator, then the slower bypass contactor K1 contacts close and fully bypass the HF AC voltage regulator and including the bidirectional AC semiconductor device S1 connected in parallel with the bypass contactor K1.

Firstly, the electronic control switches out the HF AC voltage regulator, which saves the HF AC voltage regulator internal power electronics energy usage. Secondly, the low AC mains input voltage is applied directly to the load, bypassing any voltage drop of the HF AC voltage regulator power electronics to achieve additional energy savings.

The bidirectional AC semiconductor device S1 shown in FIG. 2 is a TRIAC. However, the bidirectional AC semiconductor device can also be a rectifier bridge consist of four rectifiers with a unipolar semiconductor device configuration inserted in the bridge such as SCR, GTO, IGBT, MOSFET, back-to-back SCR's or TRIAC's; or any other bidirectional AC semiconductor device used for the same effect with drive control that can create a controlled bidirectional AC semiconductor switch device connected in parallel with the bypass contactor K1. Depending on the circuitry and application, any ordinarily skilled person in the art can design either zero voltage switching or any other controlled timing, and galvanic isolated or non-isolated switching of the bidirectional AC semiconductor device. Other semiconductor AC switch configurations and devices used in the industry such as back to back SCR's, GTO, IGBT, MOSFET, any other back to back bidirectional AC devices, or any other similar devices and switched by isolated or non-isolated means are various embodiments of the present invention.

Still referring to FIG. 2. A series current limiting resistor R1 is connected in series with the bidirectional AC semiconductor device S1 if necessary to limit the current going through the bidirectional AC semiconductor device S1. The series current limiting resistor R1 may, however, be omitted depending upon the specification and sizing of the bidirectional AC semiconductor device, bypass contactor contacts rating, and the designed surge currents. When the bypass contactor K1 contacts are opened or closed under the control electronics, the fast bidirectional AC semiconductor device S1 is also activated along with the slower contactor transition. On closing the bypass contactor K1 contacts, the electronics including the bidirectional AC semiconductor device S1 are completely bypassed. Upon opening, the bypass contactor K1 contacts are protected by the bidirectional AC semiconductor device S1 that continues to carry the bypass current until the bypass contactor K1 contacts are fully open, thus protecting the contactor contacts from current interruption.

Under the condition of high current surges, either from load surges or fault load currents, the bypass contactor K1 in combination with the bidirectional AC semiconductor device S1 bypass these high current surges by the control electronics detecting the current surge, activating the fast bidirectional AC semiconductor device and closing the bypass contactor contacts. Also, both the bypass contactor K1, and the bidirectional semiconductor device S1 are specified and sized to take the high surge currents, before the slower contactor contacts close to safely bypass the surge current from the electronics including the bidirectional AC semiconductor device. Once the surge has passed, or if it continues safely through the bypass contactor K1 closed contacts and triggers an external standard back up breaker, the control electronics detects the normal power and initiates a startup routine to return the unit to normal operation.

It will be obvious to any ordinarily skilled person in the art that a bidirectional AC semiconductor device can be used without an electromechanical bypass contactor. However, any bidirectional AC semiconductor device always has a much higher power dissipation with passing currents than the metal-metal contacts of an electromechanical bypass contactor. It is an alternative embodiment of the present invention to use only bidirectional AC semiconductor devices in place of the combination of S1 and K1 shown in FIG. 2.

It is to be noted that the bypass contactor K1 shown in FIG. 2. can be a normally close (NC) or normally open (NO) contacts, depending upon the desired application. In the present invention, the preferred embodiment for the contactor contacts of the bypass contactor K1 are normally closed (NC) and the electronics control can open and close the contactor contacts by energizing (contacts open) or de-energizing (contact closed). The reason for the use of NC contacts is that since the bypass contactor K1 is a bypass contactor, and if the input power fails, or the unit electronics fail, the contactor will then be deactivated, and the bypass contact will be closed. Firstly for input power failure or interruption, the unit and its power electronics are fully bypassed, and when input power resumes the contactor bypass will already be in place due to the NC contactor bypass contacts, and the control electronics, after a specified time period by the control electronics, can initiate a start-up routine to return the unit to normal operation.

The bypass system may comprise one or more contactors each with a parallel semiconductor switching device added, as clearly described. The bypass system as shown and described herein is for illustrating the principle of the present invention; other alternative bypass systems may be employed depending upon the application and choice of contactors. In an alternative contactor system, the contactor maybe NC or driven shunt impulse contactor with the contactor open and close impulses driven by control electronics to achieve the same working principle as the bypass system shown and described herein in details.

Referring to FIG. 2. In addition, since the bypass current flows through electromagnetic interference (EMI) filter inductors such as L1 and L4 in the active line and also L5 and L2 in the return line, for low bypass currents, and tolerated by the EMI filter inductors, the bypass system can use a single bypass contactor. In the case of heavy bypass currents, two bypass contactors can be used: one to bypass the EMI filter inductors L1 and L4, and for the return heavy bypass current, a second bypass contactor can be employed to simultaneously bypass inductors L5 and L2. Other bypass systems and methods are possible depending on the applications without deviating from the principle of one or more contactors with the bypass contacts in parallel with a semiconductor switching device with or without a current limiting resistor as shown in the drawings and the description.

The embodiments disclosed herein may be implemented using general purpose or specialized computing devices, computer processors, microcontrollers, or electronic circuitries including but not limited to digital signal processors (DSP), application specific integrated circuits (ASIC), field programmable gate arrays (FPGA), and other programmable logic devices configured or programmed according to the teachings of the present disclosure. Computer instructions or software codes running in the general purpose or specialized computing devices, computer processors, or programmable logic devices can readily be prepared by practitioners skilled in the software or electronic art based on the teachings of the present disclosure.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. An energy saving alternating current (AC) series voltage regulator for regulating an AC output voltage from an AC output power source, comprising:
   an AC high frequency (HF) series voltage buck power regulator topology for bucking an AC input voltage of an AC input power source;
   a bypass contactor system;
   a bidirectional AC semiconductor device connected in parallel with the bypass contactor system, wherein the switching response time of the bidirectional AC semiconductor device is faster than that of the bypass contactor system;
   a control circuitry for receiving the AC input voltage, the AC output voltage, and generating driving signals for the bypass contactor system and the bidirectional AC semiconductor device;
   wherein the control circuitry is configured to continuously monitor the AC input voltage level against a selectable energy saving level corresponding to an optimum energy saving setting;
   wherein the control circuitry is configured such that when the AC input voltage level is detected to be below the selectable energy saving level, the control circuitry generates a first driving signal to activate the bidirectional AC semiconductor device and a second driving signal to transition the bypass contactor system such that the bidirectional AC semiconductor device initially bypasses the AC HF series voltage buck power regulator topology, followed by the bypass contactor system contact closes to fully bypass the AC HF series voltage buck power regulator topology and the bidirectional AC semiconductor device; and
   wherein the control circuitry is configured such that when the AC input voltage level is detected to rise to or above the selectable energy saving level from a voltage level below the selectable energy saving level, the control circuitry generates a third driving signal to transition the bypass contactor system contact to open, and after the bypass contactor system contact fully opens, a fourth driving signal to deactivate the bidirectional AC semiconductor device such that the bypass contactor system is protected from current interruption during reengagement of AC HF series voltage buck power regulator topology.

2. The energy saving AC series voltage regulator of claim 1, wherein under the condition of that the AC input voltage falling below a selected optimum energy savings set level and after the bypass contactor system contacts are closed, the AC HF series voltage buck power regulator topology is disengaged with the AC input power source connected directly to the AC output power source.

3. The energy saving AC series voltage regulator of claim 1, wherein under a condition of high load surge or fault currents, the control circuitry sensing the condition, generating driving signals to activate the bidirectional AC semiconductor device and to transition the bypass contactor system such that the bidirectional AC semiconductor device initially bypasses the high load surge or fault currents away from electronics of the energy saving AC series voltage regulator, then the bypass contactor system contacts close and fully bypass the high load surge or fault currents away from electronics of the energy saving AC series voltage regulator and the bidirectional AC semiconductor device to an external breaker.

4. The energy saving AC series voltage regulator of claim 1, wherein the bypass contactor system comprising a normally closed (NC) bypass contactor.

5. The energy saving AC series voltage regulator of claim 1, wherein the AC HF series voltage buck power regulator topology comprises:
   a first and a second independently controllable AC bidirectional switches; and
   a first power inductor.

6. The energy saving AC series voltage regulator of claim 1, further comprising an input filter for eliminating HF switching energy from passing back into the AC input power source.

7. The energy saving AC series voltage regulator of claim 6, wherein the input filter comprising two capacitors and two inductors.

8. The energy saving AC series voltage regulator of claim 1, further comprising an output filter for averaging HF voltage ripple to create a smooth regulated voltage level for the AC output voltage.

9. The energy saving AC series voltage regulator of claim 8, wherein the output filter comprising two capacitors and two inductors.

10. The energy saving AC series voltage regulator of claim 1, further comprising a current transformer for generating an output current measurement signal to the control circuitry to achieve over-current protection.

11. The AC series voltage regulator of claim 5, wherein the switch driving signals for the AC bidirectional switches being pulse width modulation (PWM) control signals.

12. The energy saving AC series voltage regulator of claim 5, wherein each of AC bidirectional switches comprising one or more power semiconductor devices.

13. The energy saving AC series voltage regulator of claim 12, wherein the power semiconductor devices being back-to-back unipolar MOSFET power semiconductor devices, silicon-controlled rectifiers (SCR)'s, gate turn off thyristor (GTO)'s connected as anti-parallel AC switches, TRIAC's, insulated-gate bipolar transistors (IGBT)'s, MOSFET transistors, or SCR's configured as AC switches.

14. The energy saving AC series voltage regulator of claim 1, wherein the bidirectional AC semiconductor device being a TRIAC or a rectifier bridge consist of four rectifiers with a unipolar semiconductor device configuration inserted in the bridge such as SCR, GTO, IGBT, MOSFET, back-to-back SCR's or TRIAC's.

\* \* \* \* \*